3,272,815
PROCESS FOR THE PRODUCTION OF DIENE ADDUCTS OF HEXAETHYLIDENE-CYCLOHEXANE
Heinrich Hopff, Kusnacht, near Zurich, and Geza Kormany, Buchs, near Aarau, Switzerland, assignors to J. R. Geigy A.-G., Basel, Switzerland
No Drawing. Filed Dec. 14, 1962, Ser. No. 244,551
Claims priority, application Switzerland, Dec. 20, 1961, 14,719/61
8 Claims. (Cl. 260—250)

This invention relates to a new class of chemical compounds which are useful as intermediates in the production of plasticizers for polyvinylchloride, and to a process for producing these compounds.

We have found that adducts of hexaethylidene-cyclohexane can be produced in a very simple manner by reaction with a philodiene at relatively mild temperatures, advantageously in organic solvents. "Philodienes" as used in this specification and the appended claims are the olefinic and acetylinic hydrocarbons which react with dienes to form partially hydrogenated six-membered ring adducts. Highly reactive philodienes are those which contain in their activating group at least one double bond which is conjugated with the adduct-forming double bond of the philodienes.

It has now surprisingly been found that diene adducts of hexaethylidene-cyclohexane are obtained if a mixture of hexaethylidene-cyclohexane and a solid either highly reactive or less reactive philodiene are refluxed and thereby reacted in a suitable inert solvent of the kind defined further below, and the resulting adduct is recovered from the reaction mixture.

For instance, it is sufficient to heat hexaethylidene-cyclohexane in benzene solution for several hours at 75 to 80° C. with a highly reactive philodiene to produce the adduct in good yield. In this reaction, surprisingly only two of the conjugated double bond systems present react and linear polycondensed ring systems are formed.

Diene adducts of hexaethylidene-cyclohexane, according to the invention, are further obtained by heating and thereby reacting a mixture of hexaethylidene-cyclohexane and a philodiene which contains one of the groups HOOC—, OHC— or a lower alkoxy-carbonyl group at a temperature of about 110° to 180° while maintaining the volume constant throughout the reacton and then recovering the resulting adduct from the reaction mixture. When the reaction is carried out in a pressure vessel it is convenient to react in the presence of a di- to tri-hydroxylated benzene as dimerization and polymerization inhibitor such as hydroquinone, pyrrogallol and the like. A preferred inhibitor is hydroquinone. The reaction of hexaethylidene-cyclohexane with a philodiene which contains one of the groups HOOC—, OHC or a lower alkoxy-carbonyl group is also performed in a pressure vessel in the presence of an ether solvent at a temperature of about 110° to 180°. Of the ether solvents dioxane is advantageously used.

As philodienes which can be employed in the reaction with hexaethylidene-cyclohexane, there can be mentioned vinyl compounds such as styrene, acrylonitrile, acrylic esters having the general formula

R—CH=CH₂ wherein R represents phenyl, lower alkoxy-carbonyl or the cyano radical. Those compounds react particularly easily in which the double bond is activated by negative substituents such as carboxyl, carbonyl or nitro groups, e.g. acrolein, crotonaldehyde, azodicarboxylic acid dialkyl esters and aliphatic azo compounds such as azo diisobutyrodinitrile; and furthermore compounds having an activated triple bond, e.g. acetylene dicarboxylic acid esters and the like.

A preferred group of philodienes suitable in the process according to the invention are maleic acid and fumaric acid as well as their anhydrides and lower alkyl esters, further acrolein, crotonic aldehyde, acetylene dicarbonic acid and its lower alkyl esters, p-benzoquinone, α-napthoquinone, acrylic acid lower alkyl esters and ethylene tetranitrile.

When reacting solid philodienes, the following solvents can be used: benzene, cyclohexane, tetrahydrofurane, dioxane, halogenated alkanes such as ethylene chloride, carbon tetrachloride and ethylene tetrachloride. The choice of the solvent has been found to be critical, for such frequently used solvents as toluene and xylene lead to failure in the instant process.

The reaction of the hexaethylidene-cyclohexane with an activated philodiene generally takes place under reflux at normal pressure in the presence of the above-named solvents. If the philodienes do not contain any activated double bonds capable of addition, the process according to the invention is carried out at constant volume, for instance in an autoclave with or without solvent. The reaction with activated philodienes can also be carried out in an autoclave in order to accelerate the reaction.

On completion of the reaction, the adduct generally separates in crystalline form and can be isolated by filtration under suction and then purified by recrystallization.

The addition products according to the invention can be used as co-monomers for polymerization with vinylic monomers. They can be directly co-polymerized depending on their intended use, or they can also be converted into derivatives especially suitable for co-polymerization, before being polymerized. Particularly those adducts according to the invention which contain aldehyde groups are acetalized, and those containing acid and/or lower alkyl ester groups are converted into polyesters by reacting them with monhydric, dihydric or trihydric alcohols. In the form of their esters with aliphatic alcohols having 4 to 10 carbon atoms, the adducts according to the invention are suitable as plasticizers for vinyl chloride.

Particularly those adducts produced on the basis of unsaturated dicarboxylic acids such maleic acid and acetylene dicarboxylic acid, are readily converted into the above-named esters. The latter are particularly useful as plasticizers for vinyl chloride. Furthermore, these products are particularly unseful for co-polymerization with other monomer vinyl compounds due to their unsaturated nature.

As far as the adducts according to the invention still contain free aldehye groups, such as, e.g. those having crotonaldehyde and acrolein, they are acetalized with alcohols and the resulting acetals can be used as monomers for co-polymerization with other monomers.

Those adducts obtained with acrylic acid esters are likewise suitable as monomers for the production of copolymerizates with the other above-mentioned monomers as well as plasticizers.

Those adducts being obtained with tetracyanoethylene are likewise used for copolymerization with other monomers as well as plasticizers for polymeric vinyl compounds after being saponified and esterified with the above mentioned alcohols.

The invention is further illustrated by the following non-limitative examples in which temperatures are given in Centigrade and parts and percentages are given by weight unless stated otherwise.

*Example 1.*—48 parts of hexaethylidene cyclohexane produced as described in U.S. Patent 3,060,246 are heated for 3 hours at 83° to 84° with 64 parts of maleic acid anhydride and 480 parts of benzene whereby a reaction ensues in accordance with the following equation:

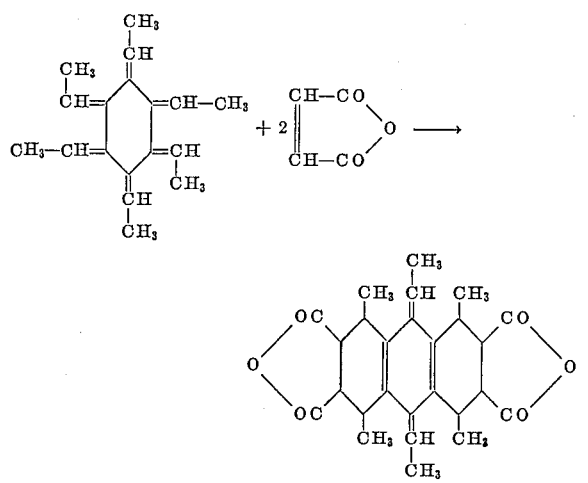

The solution is filtered hot and slowly cooled. 62 parts of the adduct of 2 moles of maleic acid anhydride and 1 mole of hexaethylidene-cyclohexane separate in the form of white crystals which, after recrystallization from dioxane, melt at 221° to 222°.

The reaction is repeated with dioxane or tetrahydrofuran instead of benzene as solvent and similar results are obtained.

On saponifying the new adduct with sodium hydroxide solution, the corresponding tetracarboxylic acid in the form of white crystals is obtained.

By esterification of this carboxylic acid with butanol the corresponding tetrabutyl ester is obtained which is particularly suitable as plasticizer for polyvinyl chloride. By esterification with octanol, 2-ethylhexanol or decanol instead of butanol, the corresponding tetraoctyl, tetra-2-ethylhexyl or tetradecyl ester is obtained.

By heating the dianhydride adduct obtained above with butanol the symmetrical bis-semi-ester is obtained from which the unsymmetrical ester which also is used as plasticizer, is then obtained after esterification with 2-ethylhexanol.

*Example 2.*—12 parts of hexaethylidenecyclohexane and 17.1 parts of acetylene dicarboxylic acid are dissolved in dioxane and heated for 6 hours to 140° in a pressure vessel. The resinous adduct obtained according to the reaction equation

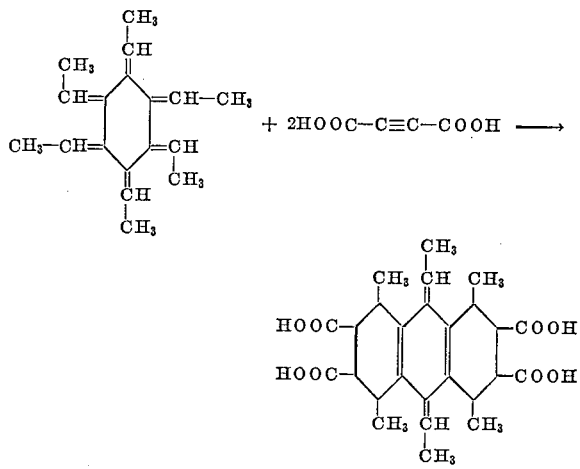

is dissolved in ether and filtered off. After concentration of the filtrate, the separated polymeric adduct is once more filtered off, washed and dried. 8 parts of the adduct are obtained. M.P. 296.2° to 297.2°.

By esterifying this resulting tetracarboxylic acid with hexanol, a tetrahexyl ester is produced which is used as a plasticizer.

*Example 3.*—12 parts of hexaethylidene cyclohexane are heated for 6 hours in an autoclave at 120° with 15 parts parts of freshly distilled acrylic acid ethyl ester in the presence of hydroquinone. The resulting brown liquid mass obtained according to the reaction equation

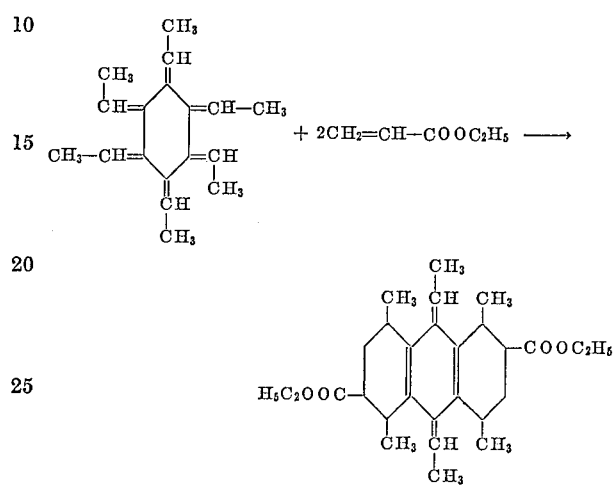

is then cooled, dissolved in ether and filtered. The residue is washed in ether and dried. A white powder is obtained which melts at 258° to 260° after being recrystallized from tetrahydrofuran. By re-esterification of this adduct with an excess of propylene glycol a polyester is produced which polymerizes to a resinous slab in a 1:1 mixture with styrene with addition of 1% benzoyl peroxide, from which articles can be shaped by methods conventioned in the polymer art.

*Example 4.*—12 parts of hexaethylidene-cyclohexane, 16.2 parts of p-benzoquinone and 120 parts of benzene are boiled for 3–4 hours and the yellow solution obtained is filtered hot. After concentrating the solution to one third its initial volume, ethanol is added and the resulting polymeric yellow adduct of the approximate molecular ratio 1:1 of the starting materials precipitates. After filtration, 12 parts of the precipitate are obtained. Its decomposition point is 203° to 204°.

This yellow adduct obtained with p-benzoquinone has a high molecular structure. The macromolecule of this high molecular substance corresponds to repetitive units of Formula I as well as terminal units of Formulas II and III

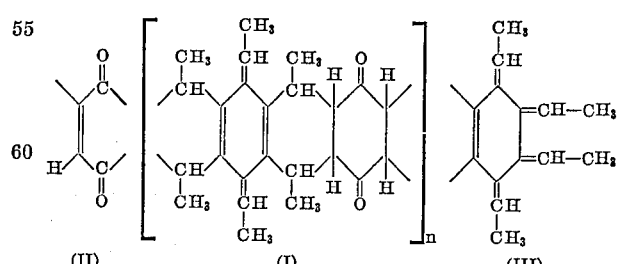

the number of which depends on the actual particle size of the product. The latter depends on the polymerization conditions, longer polymerizaion leading to larger particles.

The structural Formulas I to III also embrace the tautomers thereof, dependent on the surrounding medium according to the invention.

*Example 5.*—12 parts of hexaethylidene-cyclohexane are heated for 3 hours at 85° to 90° wth 16 parts of α- naphthoquinone and 100 parts of benzene and the adduct is worked up as described in Example 4. 10 parts of the adduct corresponding to the product of reaction equation

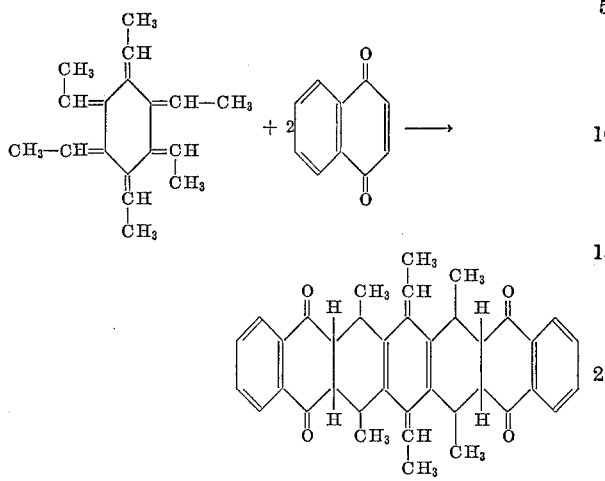

are obtaoined. M.P. 129°.

The product obtained is mixed with styrene in a molar ratio of 1:100 and polymerized by adding 0.5% of azoisobutyronitrile. It can be used as plasticizer for polyvinylchloride.

*Example 6.*—12 parts of hexaethylidene-cyclohexane are heated to 130° for 3½ hours in a pressure vessel with 8.5 parts of freshly distilled acrolein in presence of 0.2 part of hydroquinone. The transparent resin is then treated with ether. The resulting white polymeric adduct produced according to the reaction equation

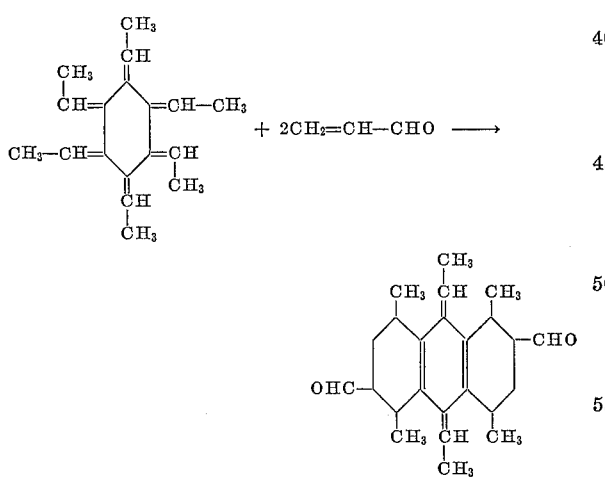

remains undissolved. This is filtered off, washed with ether and dried.

After recrystallization from dioxane a white adduct is obtained melting at 236° to 237°.

After acetalizing the dialdehyde obtained twith ethylene glycol a cyclic diacetal is obtained which is polymerized to a slab in a 1:20 mixture with methylmethacrylate while adding 0.5% of azoisobutyronitrile. The final product is suitable for uses similar to the product of Example 3.

*Example 7.*—12 parts of hexaethylidene cyclohexane are heated for 5 hours to 160° to 170° in an autoclave with 10.5 parts of freshly distilled crotonaldehyde in presence of 0.2 part of hydroquinone. The yellow resin obtained corresponding to the reaction ratio

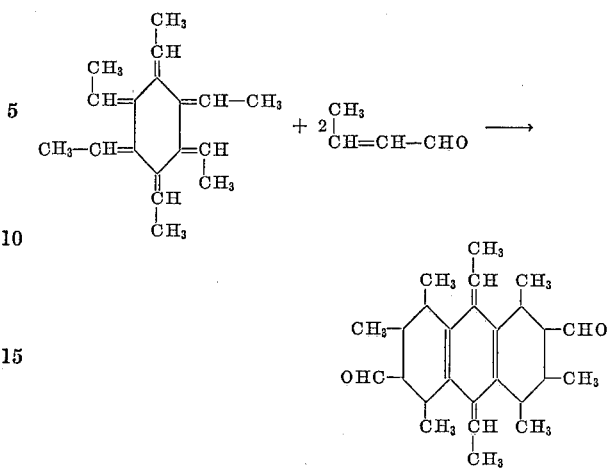

is then dissolved twice in ether free from peroxide and concentrated to a glue-like consistence in vacuo at 40°. The residue is dissolved in ether and the aldehyde condensate is precipitated wth a triple amount of methanol. The separated adduct is filtered, washed with methanol and dried at room temperature. 8.2 parts of the adduct is obtained with a melting point of 205° to 210°. It serves as a plasticizer for polyvinyl chloride.

*Example 8.*—12 parts of hexaethylidene-cyclohexane is heated to 65° to 70° with 18 parts of ethylenetetranitrile and 200 parts of tetrahydrofuran. After cooling the separated adduct is filtered off and recrystallized from dimethyl sulphoxide. Corresponding to the reaction equation

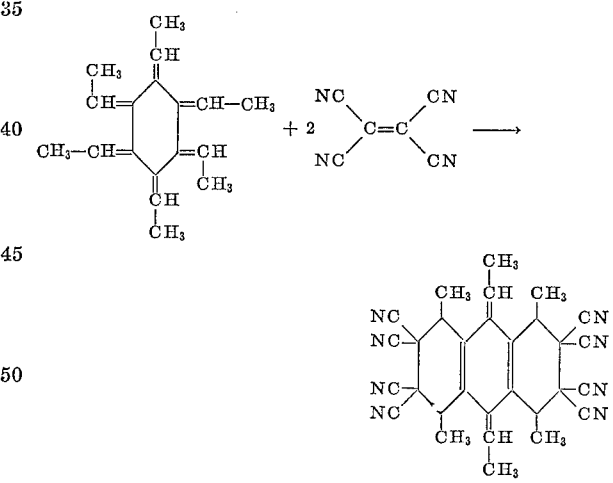

a white adduct of the end formula is obtained which decomposes at 325°.

By saponifying as described in Example 1 and thereby decarboxylizing this adduct, the corresponding tetracarboxylic acid is obtained which gives the corresponding tetraester suitable as plasticizer for polyvinyl chloride, after esterification with butanol, 2-ethylhexanol, octanol and decanol.

What we claim is:
1. A process for the production of diene adducts of hexaethylidene-cyclohexane comprising:
   (a) refluxing and thereby reacting a mixture of hexaethylidene-cyclohexane and a solid philodiene in a solvent selected from the group consisting of ether, dioxane, benzene, cyclohexane, tetrahydrofurane and halogenated alkane,
   (b) and recovering the resulting adduct of two moles of said philodiene compound with each mole of hexaethylidene-cyclohexane from the reaction mixture.

2. A process for the production of diene adducts of hexaethylidene-cyclohexane, comprising:
   (a) heating and thereby reacting a mixture of hexaethylidene-cyclohexane and a member selected from the group consisting of HOOC—, OHC— and lower alkoxy-carbonyl-containing philodienes at a temperature of about 110° to 180° while maintaining the volume constant throughout the reaction, and
   (b) recovering the resulting adduct of two moles of said philodiene compound with each mole of hexaethylidene-cyclohexane from the reaction mixture.

3. A process for the production of diene adducts of hexaethylidene-cyclohexane, comprising:
   (a) heating and thereby reacting a mixture of hexaethylidene-cyclohexane and a member selected from the group consisting of HOOC—, OHC— and lower alkoxy-carbonyl-containing philodienes in the presence of a di- to trihydroxylated benzene, as dimerization and polymerization inhibitor, at a temperature of about 110° to 180° while maintaining the volume throughout the reaction, and
   (b) recovering the resulting adduct of two moles of said philodiene compound with each mole of hexaethylidene-cyclohexane from the reaction mixture.

4. A process as described in claim 3 wherein said dimerization and polymerization inhibitor is hydroquinone.

5. A process for the production of diene adducts of hexaethylidene-cyclohexane, comprising
   (a) heating and thereby reacting a mixture of hexaethylidene-cyclohexane and a member selected from the group consisting of HOOC—, OHC— and a lower alkoxy-carbonyl-containing philodienes in an ether solvent at a temperature of about 110° to 180° while maintaining the volume constant throughout the reaction, and
   (b) recovering the resulting adduct of two moles of said philodiene compound with each mole of hexaethylidene-cyclohexane from the reaction mixture.

6. A process as described in claim 5, wherein the ether used as solvent is dioxane.

7. Process for the production of diene adducts of hexaethylidene-cyclohexane which comprises:
   (a) refluxing a mixture of hexaethylidene-cyclohexane with a philodiene selected from the group consisting of maleic acid, fumaric acid, maleic acid anhydride, maleic acid lower alkyl ester, fumaric acid lower alkyl ester, acrolein, crotonic aldehyde, acetylene dicarboxylic acid, acetylene dicarboxylic acid lower alkyl ester, benzoquinone, naphthoquinone, acrylic acid lower alkyl ester, acrylic acid, ethylene tetranitrile, azodicarboxylic acid dialkyl ester, and azodicarboxylic acid nitrile,
   (b) and recovering the resulting adduct of two moles of said philodiene compound with each mole of hexaethylidene-cyclohexane from the reaction mixture.

8. An adduct of one mole of hexaethylidene-cyclohexane and two moles of a member selected from the group consisting of fumaric acid, maleic acid, maleic acid anhydride, maleic acid lower alkyl ester, fumaric acid lower alkyl ester, acetylene dicarboxylic acid, acetylene dicarboxylic acid lower alkyl ester, acrylic acid, and acrylic acid lower alkyl ester.

References Cited by the Examiner
UNITED STATES PATENTS

| | | | |
|---|---|---|---|
| 2,781,393 | 2/1957 | Heckert et al. | 260—346.6 |
| 2,894,936 | 7/1959 | Benson | 260—346.3 |
| 2,934,544 | 4/1960 | Cripps | 260—346.3 |

OTHER REFERENCES

Bailey et al.: J. Org. Chem., vol. 27, No. 10 (1962), pp. 3479–82.

HENRY R. JILES, *Acting Primary Examiner.*